3,691,074
EXTREME PRESSURE, RUST PREVENTIVE
NONREACTIVE GREASES
Joseph F. Messina, Havertown, and Henry Gisser, Philadelphia, Pa., assignors to the United States of America as represented by the Secretary of the Army
No Drawing. Filed Apr. 6, 1971, Ser. No. 131,773
Int. Cl. C10m 7/16, 7/28
U.S. Cl. 252—25
5 Claims

ABSTRACT OF THE DISCLOSURE

Grease compositions comprising perfluoroalkylpolyether (PFAPE) fluids thickened with polytetrafluoroethylene (PTFE) for use with liquid fueled rocket engines, the grease including a small quantity of rust preventing sodium nitrite. The greases exhibit a very unexpected and significant improvement in extreme pressure characteristics, are rust preventive, and are nonreactive upon contact with conventional fuels and oxidizers, and at high impact energies in the presence of liquid oxygen and other oxidizers used in conventional rocket engines.

---

The invention described herein may be manufactured, used and licensed by or for the Government for governmental purposes without the payment to us of any royalty thereon.

Reference is hereby made to patent application Ser. No. 131,774 of Messina et al. for "Extreme Pressure, Rust Preventive Synthetic Base Greases" filed concurrently herewith, and assigned to the same assignee of this patent application.

This invention relates to improved lubricants and more particularly concerns extreme pressure and rust preventive perfluorinated greases for missile and space applications.

Perfluorinated alkylpolyether fluids prepared either by photo-oxidation of perfluoroolefins at −30° C. or by the anionic polymerization at temperatures below −27.5° C. of hexafluoropropylene epoxide in the presence of solvents using cesium fluoride have recently been made commercially available. These fluids have considerably lower vapor pressures than the perfluorotrialkylamines which had previously been utilized as components of liquid fueled rocket engine lubricants.

Alkylpolyether fluids thickened with polytetrafluoroethylene are generally suitable as inert lubricants for rocket engines powered by liquid propellants such as, ethyl alcohol, aniline, hydrocarbon fuels, diethylenetriamine (DETA), unsymmetrical dimethylhydrazine (UDMH), hydrazine, hydrogen peroxide, inhibited red fuming nitric acid (IRFNA), nitrogen tetroxide and liquid oxygen (LOX). These polytetrafluoroethylene-perfluoroalkylpolyether grease mixtures exhibit effective lubricating properties, thermal, hydrolytic and oxidative stabilities, wide temperature range, nonreactivity with fuels and oxidizers, and the like, and are now extensively used on crew compartment (Apollo) and launch components (Saturn boosters) of manned and unmanned space vehicles. While these uses indicate significant progress in the development of chemically inert lubricants for liquid fueled rocket engines, the polytetrafluoroethylene-perfluoroalkylpolyether grease mixtures do not provide highly effective load carrying capabilities or adequate protection of ferrous alloys against rust. Lubricated tapered roller bearings, SAE 4620 or SAE 8720, with 1010 mild steel roller retainer, rusted badly after 14 days exposure at 100 percent relative humidity, when tested in accordance with ASTM D 1743–64. Further tests conducted on a 440C stainless steel R-4 bearing rotating at 3000 r.p.m. at 5 p.s.i. pure oxygen at 70 percent relative humidity lubricated with perfluoroalkylpolyether - polytetrafluoroethylene grease was found to be inoperable due to extreme rusting. Such corrosion is not conducive to component operability at high humidity and salt spray environments, particularly during pre-launch intervals.

It is therefore an object of this invention to provide greases suitable for use with liquid fueled rocket engines.

Another object of the invention is to provide such greases for use with liquid fueled rocket engines, the greases being characterized by good extreme pressure properties and yet exhibiting good lubricity, rust prevention characteristics, and nonreactivity to said liquid rocket fuels and oxidizers.

Other and further objects of the invention will become apparent as the invention is further described hereinafter.

In accordance with these objects, modification of the perfluoro polymer greases with commercially and experimentally available rust inhibitors was undertaken. Initial exploratory tests indicated that adequate rust protection could not be achieved through the addition of up to 3.0 weight percent of rust inhibitors such as sorbitan monooleate, barium petroleum sulfonate, fatty amido phosphate, and the like. Also, contact compatibility tests with fuels and oxidizers showed evidence of reactivity and as a result such inhibitors could not be considered satisfactory for liquid fueled systems. Sodium nitrite however, was found to be an effective rust inhibitor with perfluoroalkylpolyether - polytetrafluoroethylene grease mixtures. This compound effected unexpectedly remarkable improvement in the extreme pressure characteristics of the grease when used with the PFAPE-PTFE system, and was non-reactive and non-sensitive to liquid rocket fuels and oxidizers tested therewith.

The fluids used to prepare the greases were fluorinated alkylpolyethers having a molecular weight between 2000 to 12,000 and a viscosity of about 18 to 424 centistokes at 100° F. Other typical physical properties of the fluid are:

| | |
|---|---|
| Viscosity, centistrokes: | |
|    At 400° F. (extrapolated) | 2.98 |
|    At 210° F. | 16.1 |
|    At 100° F. | 153 |
|    At 0° F. | 16,800 |
| Viscosity index | 119 |
| Density, grams/ml., 60° F. | 1.913 |
| Thermal coefficient of expansion, ° F. (77° F. to 250° F.) | 0.00055 |
| Pour point, ° F. | −15 |
| Flash/fire, COC | Non-flammable |
| Acid number, Mg. KOH/gm. | 0.0 |
| Color, Saybolt | +30 |
| Corrosion and oxidation stability, 400° F./72 hours: | |
|   Weight change, mg./cm.$^2$: | |
|     Copper | 0.00 |
|     Aluminum alloy | +0.03 |
|     Magnesium alloy | +0.03 |
|     Steel | +0.03 |
|     Silver | +0.03 |
|   Appearance pitting, etching, corrosion | None |
|   Viscosity change at 100° F., percent | +2.62 |
|   Acid number increase, mg./KOH/gm. | 0.0 |

Evaporation loss:
- 300° F./22 hours, percent — 6.0
- 400° F./6½ hours, percent — 11.4

Refractive index, $n_D^{20}$ — 1.300
Surface tension, dyne/cm. at 20° C. — 20
Specific heat, B.t.u./lb./° F. — 0.24
Dielectric strength, kv. — 35+
Dielectric constant:
- At 50 Hz. — 2.15
- At 1000 Hz. — 2.17

Volume resistivity, ohm-cm., at 77° F. — $>10^{15}$
Dissipation factor at 77° F., percent — $<10^{-4}$
Particulate contamination, particles/100 ml., particle size range, microns:
- 5–15 — 750
- 15–25 — 200
- 25–50 — 35
- 50–100 — 18
- 100+ — 2

Our thickener was a low molecular weight tetrafluoroethylene polymer. Typical properties of this solid are: softening point 321.1° C., mol. wt. 10,000–50,000, particle size 100% less than 30 microns. The product was supplied as a 7.5% suspension in trichlorotrifluoroethane.

Each grease mixture was prepared as follows: The dispersion of PTFE (polytetrafluoroethylene) in trichlorotrifluoroethane was heated on a steam bath until ~50% of the solvent evaporated. Approximately 75% of the required quantity of base oil was then added. The resultant mixture was stirred and heating continued until all of the trichlorotrifluoroethane had evaporated. (The absence of trichlorotrifluoroethane was determined by gas chromatography using the following technique: A sample of the grease mixture was extracted using C.P. benzene. The extracted fluid mixture was placed in a gas chromatograph with a 20 feet carbowax 20 M column at 50° C. and a helium gas flow of 10 ml. per minute. Absence of a retention peak after 3.3 minutes indicated that all of the trichlorotrifluoroethane had evaporated.) The remainder of the base oil was then added while stirring, and stirring continued until a homogenous grease-like product was obtained. The mixture was cooled to room temperature. Sodium nitrite was then added and thoroughly mixed into the grease by passing the grease twice through a colloid mill with a stator-to-rotor clearance set at 0.001 inch. The homogenized mixture was then placed in a freezer at minus 10° C. for 24 hours, removed and permitted to remain at room temperature an additional 24 hours prior to use.

Table I below illustrates the improved extreme pressure properties of our grease, when tested in accordance with ASTM D 2596-69.

All viscosities shown in the following tables were obtained at 100° F. The PTFE used throughout had a molecular weight between about 10,000–50,000, and the NaNO₂ was of technical grade, a powder, having a particle size of approximately 10 microns, or smaller.

TABLE I.—LOAD CARRYING CAPACITY

| Grease Number | Composition, wt. percent | Weld, kg. |
|---|---|---|
| 1 | 86% PFAPE (153 cst.) plus 14.0% PTFE | 300–400 |
| 2 | 85% PFAPE (153 cst.) plus 13.5% PTFE plus 1.5% NaNO₂ | >800 |
| 3 | 86.0% PFAPE (85 cst.) plus 14.0% PTFE | 400–600 |
| 4 | 85.0% PFAPE (85 cst.) plus 14.0% PTFE plus 1.0% NaNO₂ | >800 |

As indicated above, Greases Nos. 2 and 4, containing the sodium nitrite, substantially improved the load-carrying capacities of the PFAPE–PTFE mixture.

The PFAPE fluid should, in accordance with our invention, range between about 85–88%, by weight, of the grease and the PTFE thickener should range between about 12 to 15 weight percent, while the NaNO₂ would preferably fall within the range of about .25 to 1.50 weight percent.

The rust prevention properties of our grease are tabulated in Table II below, the data being obtained in accordance with ASTM D 1743-64, wherein lubricated tapered roller bearings, SAE 4620 or 8720 ferrous alloy with 1010 mild steel roller retainers were exposed to 100% relative humidity for 14 days at 25±0.5° C. This test is accepted for greases used by the military and is currently specified in numerous government specifications. The bearings lubricated with our greases showed no corrosion whereas those without the inhibitor rusted badly.

TABLE II.—RUST PREVENTION

| Grease Number | Composition, wt. percent | Rust test [1] |
|---|---|---|
| 1 | 86.0% PFAPE (153 cst.) plus 14.0% PTFE | Fail. |
| 2 | 85.0% PFAPE (153 cst.) plus 13.5% PTFE plus 1.5% NaNO₂ | Pass. |
| 3 | 86.0% PFAPE (85 cst.) plus 14.0% PTFE | Fail. |
| 4 | 85.0% PFAPE (85 cst.) plus 14.0% PTFE plus 1.0% NaNO₂ | Pass. |

[1] ASTM D 1743-64.

Liquid oxygen (LOX) impact compatibility tests of our greases, i.e., 85–88 weight percent PFAPE, 12–15 weight percent PTFE, and .25–1.5 weight percent NaNO₂, when made as above described, were determined. These tests were run at the impact level of 72.3 foot-pounds, all in accordance with Specification 106, Compatibility Testing, Liquid Oxygen Systems and Materials, Marshall Space Flight Center, Huntsville, Ala. The greases were considered nonreactive with LOX if they withstood 20 separate impact trials without reaction (flashes, explosions or other indications of sensitivity). None of the materials tested were found to be reactive with LOX, and therefore it is reasonable to assume that our greases would be non-reactive with other oxidizers, such as $H_2O_2$, IRFNA, and $N_2O_4$.

It is apparent from the foregoing that we have provided a grease composition admirably suited to rocket and missile applications, the grease exhibiting highly effective load carrying capabilities and yet rust preventive and non-reactive and non-sensitive to currently used liquid fuels and oxidizers.

We wish it to be understood that we do not desire to be limited to the exact details described, for obvious modifications will occur to a person skilled in the art.

We claim:

1. An extreme pressure lubricating grease composition for use with liquid fueled rocket engines and the like comprising, by weight, about
    85 to 88% perfluoroalkylpolyether fluid having a molecular weight ranging between about 2,000 to 12,000 and a viscosity at 100° F. of about 18 to 424 centistokes; 12 to 15% polytetrafluoroethylene having a molecular weight between about 10,000 to 50,000; and about 0.25 to 1.50% of sodium nitrite.

2. The composition of claim 1 wherein said perfluoroalkylpolyether fluid is present in an amount of 85%, by weight, said polytetrafluoroethylene is present in an amount of 13.5% by weight, and said sodium nitrite is present in an amount of 1.5% by weight.

3. The composition of claim 2 wherein said fluid has a viscosity of 153 centistokes at 100° F.

4. The composition of claim 1 wherein said perfluoroalkylpolyether fluid is present in an amount of 85%, by weight, said polytetrafluoroethylene is present in an amount of 14%, by weight, and said sodium nitrite is present in an amount of 1.0%, by weight.

5. The composition of claim 4 wherein said perfluoroalkylpolyether fluid has a viscosity of 85 centistokes at 100° F.

References Cited

UNITED STATES PATENTS

| | | | |
|---|---|---|---|
| 3,011,975 | 12/1961 | Nitzsche et al. | 252—25 |
| 3,432,432 | 3/1969 | Dreher | 252—25 |
| 3,505,229 | 4/1970 | Skehan | 252—54 |
| 3,525,690 | 8/1970 | Christian | 252—54 |

DANIEL E. WYMAN, Primary Examiner

I. VAUGHN, Assistant Examiner

U.S. Cl. X.R.

252—54, 387